United States Patent [19]
Juday et al.

[11] Patent Number: 5,728,977
[45] Date of Patent: Mar. 17, 1998

[54] APPARATUS AND METHODS FOR DETERMINING THE QUANTITY OF AND STABILIZING A PLURALITY OF SOILED INDUSTRIAL TOWELS

[76] Inventors: Thomas W. Juday, 1060 Lower Ridgeway, Elm Grove, Wis. 53122; Mervyn H. Edwardsen, 5180 Magellan Dr., New Berlin, Wis. 53151; James M. Leef, 1155 Gray Fox Hollow, Brookfield, Wis. 53045; David B. Leef, 1411 Genesee St., Delafield, Wis. 53018

[21] Appl. No.: 629,674

[22] Filed: Apr. 9, 1996

[51] Int. Cl.$^6$ .................... G01G 19/42; D06F 29/00
[52] U.S. Cl. .................. 177/25.17; 177/1; 177/245; 8/150; 68/13 R; 68/205 R
[58] Field of Search ................ 177/1, 15, 25.11, 177/25.12, 25.13, 25.17, 245; 8/150, 158; 68/13 R, 22 R, 205 R; 364/567, 568

[56] References Cited

U.S. PATENT DOCUMENTS

| | | | |
|---|---|---|---|
| 3,701,627 | 10/1972 | Grunewalder | 8/142 |
| 3,768,283 | 10/1973 | Bold et al. | 68/205 R |
| 4,157,738 | 6/1979 | Nishiguchi et al. | 177/1 |
| 4,336,024 | 6/1982 | Denissenko et al. | 8/150 |
| 4,629,016 | 12/1986 | Knothe et al. | 177/25.17 |
| 4,817,650 | 4/1989 | Tilton | 134/76 |
| 4,889,644 | 12/1989 | Amberg et al. | 252/8.9 |
| 4,922,922 | 5/1990 | Pollack et al. | 177/245 |
| 5,062,996 | 11/1991 | Kaylor | 252/610 |
| 5,104,454 | 4/1992 | Yokozawa et al. | 134/11 |
| 5,244,566 | 9/1993 | Bond | 208/180 |
| 5,302,320 | 4/1994 | Hosmer et al. | 252/356 |
| 5,381,574 | 1/1995 | VonPless | 8/158 |

Primary Examiner—Michael L. Gellner
Assistant Examiner—Randy W. Gibson
Attorney, Agent, or Firm—Quarles & Brady

[57] ABSTRACT

A method of stabilizing a plurality of soiled towels and determining the quantity of the towels comprises removing any foreign objects from the soiled towels, saturating the soiled towels with a liquid that prevents the evaporation of any volatile compounds, compressing the saturated towels to remove unabsorbed liquid, then weighing the compressed towels and calculating the approximate number of towels present by dividing the weight of the soiled compressed towels by the known weight of a soiled compressed towel. An apparatus for performing the method also is disclosed.

10 Claims, 1 Drawing Sheet

APPARATUS AND METHODS FOR DETERMINING THE QUANTITY OF AND STABILIZING A PLURALITY OF SOILED INDUSTRIAL TOWELS

THE FIELD OF THE INVENTION

The present invention relates to industrial towels. More particularly, it relates to an apparatus and methods for stabilizing a plurality of soiled industrial towels and determining the quantity of such towels.

BACKGROUND OF THE INVENTION

A wide variety of industries, such as the printing industry, use industrial grade towels for wiping off equipment and for a wide variety of other uses. These industrial grade cotton towels are lent to the users by suppliers who own the towels. The suppliers give the users a quantity of clean towels; take soiled towels back from the user and clean them; and then exchange clean towels for the soiled ones.

Some of the soiled towels that are returned to suppliers contain dangerous volatile organic compounds (VOC's) which can pose safety risks to the suppliers' personnel who must handle and count the soiled towels being exchanged. In addition, if they are not washed immediately upon receipt by the supplier, soiled towels which contain VOC's also can cause a serious storage problem because the evaporating VOC's can pose both a health and a fire risk for the supplier.

It obviously would be advantageous for suppliers of industrial towels to have an apparatus and methods for safely stabilizing the soiled towels while they are being stored prior to washing and for determining the quantity of the soiled towels.

BRIEF SUMMARY OF THE INVENTION

It is an object of the present invention to disclose a method for safely determining the quantity of soiled towels being returned for exchange.

It is also an object of the present invention to disclose a method for stabilizing the soiled towels while they are being stored prior to washing so that they do not pose a health or fire risk.

It is further an object to disclose apparatus that can be used to perform the above methods.

The method of the present invention for safely determining the quantity of a plurality of soiled towels of unknown quantity comprises spreading apart the plurality of soiled towels so any foreign objects can be removed; saturating the soiled towels with a nonvolatile liquid which prevents VOC's from evaporating at ambient temperatures; applying pressure to said saturated towels to compress said towels and remove substantially all of the unabsorbed liquid therefrom; weighing said plurality of compressed soiled towels; and then calculating the approximate number of the soiled towels by dividing the total weight of the plurality of the compressed soiled towels by the known weight of a single compressed towel.

The method of the present invention for stabilizing soiled towels containing VOC's prior to washing said towels comprises saturating a plurality of soiled towels with a non-volatile liquid, which prevents the VOC's from evaporating from said towels at ambient temperatures; compressing said towels to remove unabsorbed liquid from said towels and then storing the compressed soiled towels in a container which does not adversely react with said towels or liquid under ambient conditions.

The apparatus of the present invention comprises a receiving table for receiving a plurality of soiled towels and permitting an operator to spread the soiled towels apart and to remove foreign objects therefrom; saturating means for saturating the soiled towels in a nonvolatile liquid which prevents VOC's from evaporating therefrom under ambient conditions; compressing means for compressing the soiled towels, which have been saturated in the nonvolatile liquid, to remove substantially all of the liquid which has not been absorbed by the towels; weighing means for weighing the plurality of compressed soiled towels and obtaining the total weight therefor; and, calculating means for determining the approximate quantity of the soiled towels by dividing the total weight by the average weight of a compressed soiled towel.

The apparatus described above can be used both in the method of determining the quantity of the soiled towels and in the method of stabilizing the soiled towels.

DESCRIPTION OF THE PREFERRED EMBODIMENTS

Figure 1:
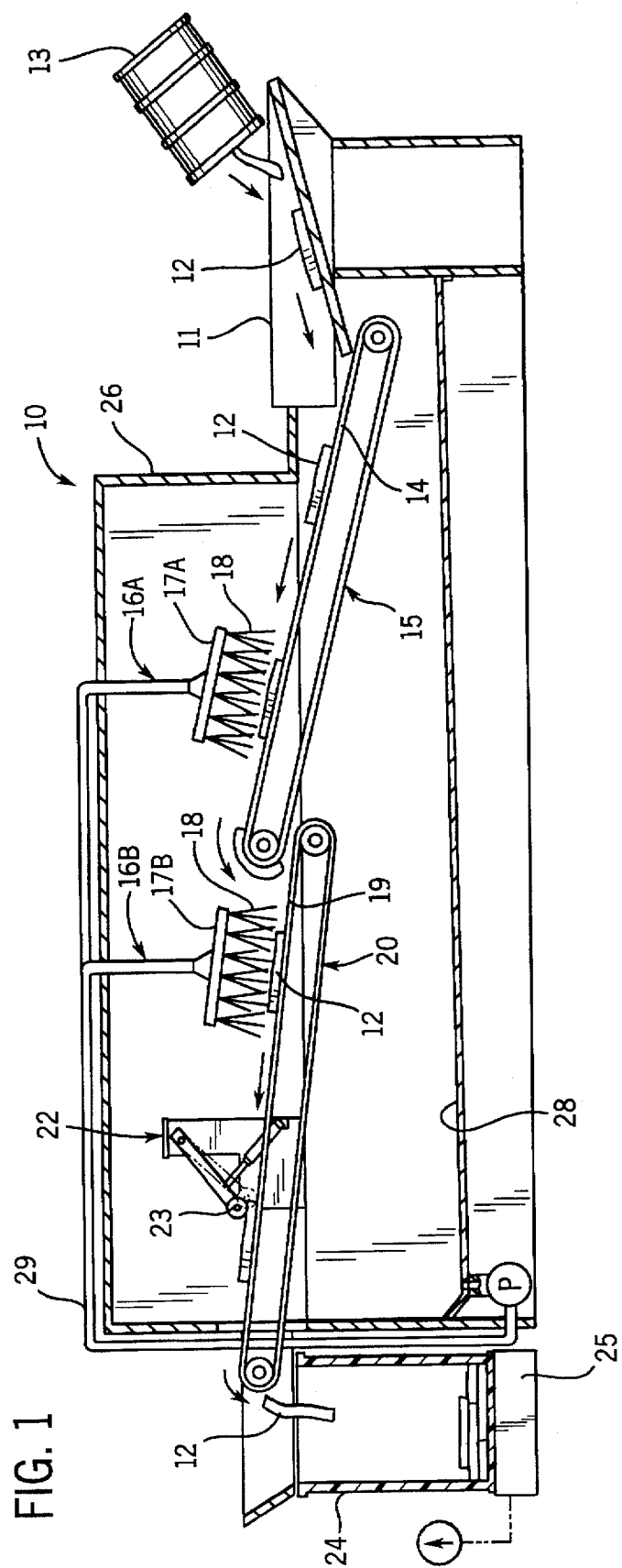
FIG. 1 is an elevational view of a preferred embodiment of the apparatus of the present invention.

In a preferred embodiment of the present invention, the apparatus 10 comprises a receiving table 11 onto which soiled towels 12 can be dumped from a container 13 and spread by an operator, (not shown), who removes any foreign objects, (not shown).

The operator, who is preferably wearing protective clothing and gloves, places the soiled towels 12 onto the moving belt 14 of a first conveyor 15. The first conveyor 15 carries the soiled towels to a saturating means 16A which comprises a first set of spray nozzles 17A which are located above the belt 14 and towels 12. While the towels 12 are passing under the spray nozzles 17A, the top surface of the towels is sprayed and saturated with a nonvolatile liquid 18, such as an aqueous solution containing an emulsifying agent which forms emulsions with volatile organic compounds (VOC's) and prevents the VOC's from evaporating.

Still referring to FIG. 1, the towels 12 are moved to the end of and off of the first conveyor 15. As the towels 12 fall they flip over so that as they lay on the moving belt 19 of a second conveyor 20 their former bottoms are now their tops. The first conveyor 15 and second conveyor 20 constitute the preferred conveying means. The conveyor 20 takes them to the second half of saturating means 16B. While the towels 12 are passing under the second set of spray nozzles 17B, the original bottoms 24 of the towels 12 are saturated with more of the non-volatile liquid 18. From the second set of spray nozzles 17B, the towels 12 move to a compressing means 22 which comprises at least one roller 23 which can be adjusted to exert a compressing force upon the towels 12 to remove therefrom any unabsorbed nonvolatile liquid 18. From the compressing means 22, the towels 12 are carried up and off the end of the second conveyor 20 whereupon they fall into a container 24 which is of known weight and preferably made of a material which does not react with either the towels 12 or the nonvolatile liquid 18.

As seen in FIG. 1, the container 24 sits upon a weighing means 25. When all the towels 12 are in the container 24, the weighing means 25, which is preferably an electronic scale which includes calculating means, automatically subtracts the known weight of the container 24 and divides the total weight of the plurality of compressed towels by the weight of an identical single compressed towel, thus determining the approximate quantity of towels which were originally in the plurality of towels.

Still referring to FIG. 1, the apparatus 10 is seen to include an upper framework 26 which extends from the receiving table 11 to the end of the conveyor 20. The framework 26 is further provided with transparent vertical panels (not shown) which serve to both direct any misdirected nonvolatile liquid in the saturating means area downwardly and also to permit the operator to observe the progress of the towels through the apparatus. Positioned below the conveying means is the collection tank 28 which collects the unabsorbed nonvolatile liquid 18 from the area of the saturating means and the area of the compressing means. The collection tank 28 is provided with a pump (P) which recycles the collected nonvolatile liquid 18 back to the saturating means via piping 29.

It will be appreciated by those skilled in this art, that if it is only desired to practice the method of the invention which comprises stabilizing the towels for storage and it is not desired to determine the approximate quantity of towels, the apparatus can be simplified by eliminating the weighing and calculating means.

The preferred nonvolatile liquid for use in the methods of the present invention is an aqueous nonsudsing solution of an emulsifying agent. Preferably such an aqueous solution contains about 2% to about 10% by weight of the emulsifying agent.

Suitable emulsifying agents for use in the practice of the present invention include those disclosed in U.S. Pat. No. 5,302,320 which contain an ethoxylated nonylphenol; a soap of a tall oil and an alkenolamine; and, a tripropylene glycol methyl ether. Other emulsifiers that can be used include cationic, anionic and non-ionic surfactants which form emulsions in aqueous solution with the VOC's (e.g. Monamulse 947 produced by Mona Industries, Inc. of Patterson, N.J.).

The preferred container 24 for the compressed towels containing absorbed nonvolatile liquid is a wide mouth drum which is of a material that does not absorb or otherwise react adversely with the towels or the nonvolatile liquid under normal ambient storage conditions. Especially preferred as container 24 are drums of polypropylene or polyethylene.

It will be apparent to those skilled in the art that although the method of the present invention for determining the quantity of the soiled towels may not be perfectly accurate, no method of counting is perfect and the method of the invention is accurate enough for commercial use.

It will also be apparent to those skilled in the art that a number of modifications and changes can be made without departing from the spirit and scope of the invention. For example, in place of two separate conveyors, a single conveyor could be used as the conveying means. Further, in place of two sets of spray heads, a single set could be used as a saturating means. In addition, the conveyors could be equipped with open mesh belts which would permit unabsorbed liquid to flow both through the towels and the belts. Open mesh belts also would permit the towels to be sprayed by a spray directed upwardly from below the belts. Also, the calculating of the approximate quantity of the towels based on their total weight could be done manually. In view of the number of possible modifications and changes, it is intended that the invention only be limited by the claims.

We claim:

1. A method for safely determining the quantity of towels in a plurality of soiled towels, said method comprising removing any undesirable foreign objects from an unknown plurality of towels; saturating the plurality of soiled towels with a liquid which prevents the evaporation of any volatile organic compounds present in the towels; compressing the saturated towels to remove substantially all the unabsorbed liquid therefrom; weighing said plurality of compressed soiled towels, to obtain their total weight; and, then dividing the total weight by the known weight of a single compressed towel containing the absorbed liquid to obtain the approximate quantity of towels in said plurality of soiled towels.

2. The method of claim 1 in which the nonvolatile liquid is a aqueous solution of an emulsifying agent.

3. The method of claim 2 in which the emulsifying agent is one which is essentially nonsudsing in aqueous solution.

4. An apparatus for determining the approximate quantity of a plurality of soiled towels which may contain volatile organic compounds, said apparatus comprising:

a receiving table where a plurality of soiled towels can be spread apart and any undesired foreign objects removed;

a saturating means for saturating the towels with a liquid which prevents any volatile organic compounds from evaporating from said towels;

a compressing means for applying a compressive force to the towels to remove substantially all of the unabsorbed liquid therefrom;

a weighing means for determining the total weight of the plurality of compressed soiled towels; and, a calculating means for dividing said total weight by the known weight of a single compressed soiled towel containing absorbed liquid thereby obtaining the approximate number of towels in said plurality of towels.

5. An apparatus of claim 4 which includes conveying means for conveying the soiled towels from the receiving table to the saturating means, the compressing means and the weighing means.

6. An apparatus of claim 4 in which an electronic scale in both the weighing means and the calculating means.

7. An apparatus of claim 4 in which the saturating means comprises spray nozzles which spray the towels with a nonvolatile liquid.

8. An apparatus of claim 4 in which the compressing means comprises at least one roller which exerts a force upon and compresses the saturated towels sufficiently to remove substantially all unabsorbed liquid therefrom.

9. The apparatus of claim 4 in which there is a liquid collection tank below the saturating means and compressing means.

10. An apparatus of claim 9 which includes a pump for recycling liquid from the collection tank to the saturating means so that the liquid can be used to saturate a new supply of soiled towels.

* * * * *